United States Patent
Cress

(10) Patent No.: US 6,273,465 B1
(45) Date of Patent: Aug. 14, 2001

(54) RESILIENT AIRBAG METHOD AND APPARATUS

(76) Inventor: Steven B. Cress, P.O. Box 30, Glenbrook, NV (US) 89413

( * ) Notice: Subject to any disclaimer, the term of this patent is extended or adjusted under 35 U.S.C. 154(b) by 0 days.

(21) Appl. No.: 09/405,815

(22) Filed: Sep. 24, 1999

(51) Int. Cl.⁷ ............................. B60R 21/13; B62D 25/06
(52) U.S. Cl. ............................................. 280/748; 296/212
(58) Field of Search .................................. 280/730.2, 742, 280/743.1, 736, 737, 750, 748, 749, 730.1, 739; 296/210, 212, 214, 189

(56) References Cited

U.S. PATENT DOCUMENTS

| | | | |
|---|---|---|---|
| 3,451,693 | * | 6/1969 | Carey ..................................... 280/739 |
| 3,516,685 | * | 6/1970 | Goetz ..................................... 280/739 |
| 3,684,309 | * | 8/1972 | Uchiyamada et al. ............. 280/743.1 |
| 3,814,459 | * | 6/1974 | Eckels .................................... 280/150 |
| 3,861,710 | * | 1/1975 | Okubo ................................. 280/743.1 |
| 3,887,213 | * | 6/1975 | Goetz .................................... 280/150 |
| 5,007,662 | * | 4/1991 | Abramczyk et al. ............ 280/739 X |
| 5,470,103 | * | 11/1995 | Vaillancourt et al. ............. 280/730.1 |
| 5,492,363 | * | 2/1996 | Hartmeyer et al. .............. 280/739 X |
| 5,533,752 | * | 7/1996 | Brown et al. ......................... 280/739 |
| 5,554,913 | * | 9/1996 | Yamanishi et al. .................. 280/739 |
| 5,575,497 | * | 11/1996 | Suyama et al. ..................... 280/730.1 |
| 5,615,914 | * | 4/1997 | Galbraith et al. .................... 280/739 |
| 5,772,238 | * | 6/1998 | Breed et al. .................. 280/730.1 X |
| 5,775,726 | * | 7/1998 | Timothy et al. ................... 280/730.1 |
| 5,803,495 | * | 9/1998 | Jackson et al. .................... 280/743.1 |
| 5,851,029 | * | 12/1998 | Klinger et al. .................... 280/739 X |
| 5,865,462 | * | 2/1999 | Robins et al. ..................... 280/730.1 |
| 5,884,937 | * | 3/1999 | Yamada ............................. 280/730.2 |
| 5,899,491 | * | 5/1999 | Tschaeschke ..................... 280/730.2 |
| 5,904,370 | * | 5/1999 | Steiner et al. ................ 280/730.1 X |
| 5,924,722 | * | 7/1999 | Koide et al. ....................... 280/730.2 |
| 5,924,723 | * | 7/1999 | Brantman et al. ................ 280/730.2 |
| 5,931,497 | * | 8/1999 | Fischer ............................... 280/743.1 |
| 6,000,715 | * | 12/1999 | Tscheschke ....................... 280/730.2 |
| 6,010,149 | * | 1/2000 | Riedel et al. ...................... 280/730.2 |
| 6,017,059 | * | 1/2000 | Taubenberger et al. .......... 280/730.1 |

* cited by examiner

Primary Examiner—Peter C. English
Assistant Examiner—Toan C To
(74) Attorney, Agent, or Firm—Herbert C. Schulze

(57) ABSTRACT

An improved airbag system for vehicle consisting of a compartmentalized airbag wherein inflation of the airbag is controlled so that at least one compartment inflates at a lower pressure than the pressure with which at least one other compartment inflates in order that the affect of the airbag impacting upon vehicle occupants or cargo is cushioned; further enhancement of safety is accomplished by using hook and loop material to hold the inflated bag in position with respect to the vehicle and the occupants or cargo when inflated in order to reduce damage or injury due to excessive movement during and after an accident; and safety is further enhanced by prestressing vehicle compartments with inflated airbags within the vehicle compartments.

1 Claim, 3 Drawing Sheets

RESILIENT AIRBAG METHOD AND APPARATUS

CROSS REFERENCE TO RELATED PATENT APPLICATIONS

There are no patent applications filed by me related to the within application.

BACKGROUND OF THE INVENTION

I. FIELD OF THE INVENTION

This invention is in the general field of airbags utilized for the protection of humans, or other cargo being transported in the event of a mishap occurring to the transport apparatus;

The invention is more particularly directed to such airbags wherein the airbags will impinge softly upon the humans, or other cargo;

The invention is most particularly directed to airbags having multiple interior compartments within a single airbag, with the contact wall of the airbag which impinges upon the humans, or other cargo being under less pressure than the pressure of the other portions of the airbag allowing slower and softer expansion of the contact wall compartment.

II. DESCRIPTION OF THE PRIOR ART

There is much art in airbag deployment for the protection of humans and other cargo. There have been attempts to protect the humans or other cargo from the usual harsh impact caused by the sudden deployment of airbags. Some representative recent United States Patents in the general field are U.S. Pat. Nos. 5,542,700; 5,738,371; 5,765,863; 5,806,884; 5,820,160; 5,829,785; 5,833,265; 5,851,027; and 5,918,901.

None of the above patents, nor anything else I have been able to find, approaches, anticipates, or suggests my new system. In that sense I believe there is no true prior art to this invention.

SUMMARY OF THE INVENTION

Airbags are in wide use in vehicles or the like for the protection of persons or other cargo in the event of a vehicle mishap such as a collision, roll-over, or the like. Airbags are very valuable in preventing serious injuries in many cases.

However, airbags frequently cause serious injuries and even death because of the rapid and very hard and unyielding force with which the airbag contact surface strikes individuals or cargo within a vehicle when the airbag is activated.

Sometimes airbags inflate accidently without the vehicle or the like in which they are installed being involved in an accident or the like. In such cases, occupants or cargo within the vehicle or the like may be unnecessarily injured or damaged.

I have studied airbags and their methods of inflation, frequently by explosives within the bag. While there have been some attempts to soften the blow of the airbag against a person or cargo by locating the airbags in specific areas, etc, such attempts have been less than fully effective. Even the most carefully placed airbag can cause serious injury depending upon the conditions under which it inflates, and other factors such as age of a vehicle occupant, etc.

I have now solved this problem by constructing a novel and unique airbag in which I have installed what amounts to a "compartmentalized airbag".

There are various versions of my compartmentalized airbag.

In one version an airbag is formed in customary manner. However, a membrane of permeable material is fastened within the airbag and along the area which will come into contact with a person or other cargo when the airbag inflates. The membrane is connected to the airbag interior in such manner that when fully inflated there will be a bag consisting of the portion of the airbag which comes in contact with a person or other cargo and the membrane, which I will refer to as a secondary compartment. The main, or primary, portion of the airbag will then be the compartment between the membrane and the portion of the airbag which does not come into contact with the vehicle occupants or other cargo. It is the latter primary compartment of the airbag which will contain the explosives or other material which rapidly fills the airbag with fluid under pressure. With the permeable membrane in place, when the airbag inflates the secondary compartment will inflate more slowly and under less pressure than the primary compartment due to the necessity of the fluid under pressure permeating through the permeable membrane. The speed at which the inflation of the secondary compartment takes place is controllable by varying the permeability of the membrane With my new airbag, the secondary compartment initially will be softer than the primary compartment due to the interior airbag fluids being slowed while permeating the permeable membrane. Additionally, the permeable membrane will allow the air bag fluids to be forced back through the membrane from the secondary compartment into the primary compartment allowing a further softening of the blow of the wall of the airbag against a person or other vehicular cargo.

In another version of my new air bag a complete permeable bag containing the explosives or other rapidly expansive fluid production means is located within a larger impermeable bag. When the fluids with the permeable bag expand to completely fill the permeable bag, the fluids will slowly permeate into the exterior bag, thereby softening the blow of anything which the bag contacts. Also, the impact upon an object can cause some of the fluid to permeate back into the interior bag which further softens the blow.

It is possible to have a multiplicity of permeable membranes or permeable bags in order to accomplish varying degrees of resilience when the fluids are expanding within the airbag system.

In each version of this invention, the softening of the impact may be enhanced by having a multiplicity of secondary compartments or permeable compartments or bags so that the expanding fluids will be further slowed and the impact further softened by passing through a multiplicity of permeable barriers.

When I refer to "bags" it is understood that I mean a "bag" is a "compartment" as well as a "compartment" formed by a membrane or the like.

It is an object of this invention to provide a method and apparatus which will soften the force of impact upon an item by activation of an airbag which contacts the item;

Another object of this invention is to provide such a method and apparatus wherein the introduction of high pressure fluid into a device which contacts an item is controlled so as to soften the impact caused by rapid expansion of fluid within the device;

Another object of this invention is to provide a means by which expanding fluid within an airbag may travel through a permeable membrane in both directions to control the force with which the airbag strikes an item.

The foregoing and other objects and advantages of this invention will be understood by those skilled in the art upon reading the description of a preferred embodiment, which follows, in conjunction with a review of the appended drawings.

DESCRIPTION OF A PREFERRED EMBODIMENT

Figure 1:
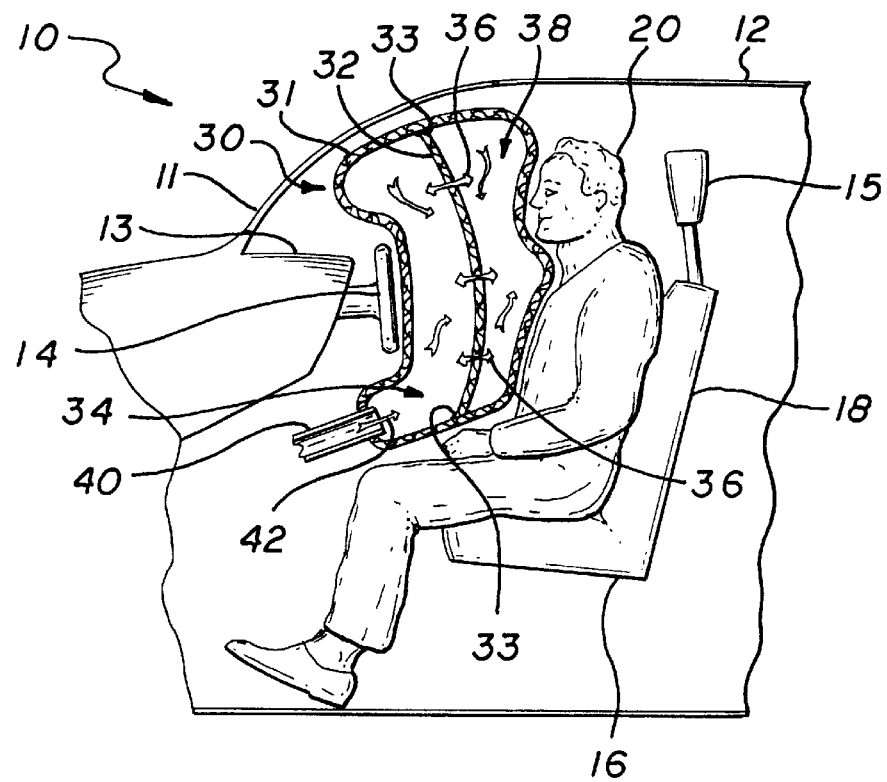
FIG. 1 is a partially broken away schematic sectioned view of a deploying air bag suitable to practice the method of my new air bag system.

An inventory of items bearing reference numerals is:

| Numeral | Item Description |
|---|---|
| 10 | vehicle in which airbag is located |
| 11 | vehicle windshield |
| 12 | vehicle roof |
| 13 | vehicle dashboard |
| 14 | steering wheel |
| 15 | head rest |
| 16 | seat |
| 18 | seat back |
| 20 | vehicle occupant |
| 30 | airbag generally |
| 31 | outer wall of airbag |
| 32 | permeable membrane |
| 33 | membrane attachment to outer wall |
| 34 | primary portion of airbag with expanding fluids |
| 36 | directional flow of fluids through membrane |
| 38 | secondary compartment of airbag with expanding fluids under reduced pressure |
| 40 | tube |
| 42 | expanding fluids |
| 110 | vehicle in which airbag is located |
| 111 | vehicle windshield |
| 112 | vehicle roof |
| 113 | vehicle dashboard |
| 114 | steering wheel |
| 115 | head rest |
| 116 | seat |
| 118 | seat back |
| 120 | vehicle occupant |
| 130 | airbag generally |
| 131 | outer impermeable bag |
| 132 | permeable inner bag |
| 134 | expanding fluids in permeable inner bag |
| 136 | directional flow of fluids through permeable inner bag |
| 138 | space between bags with expanding fluids under reduced pressure |
| 330 | impervious outer bag |
| 332 | secondary permeable inner bag |
| 333 | primary permeable inner bag |
| 334 | expanding fluids within primary permeable inner bag |
| 335 | expanding fluids between primary and secondary permeable bags |
| 336 | directional flow of fluids through primary permeable bag |//
| 337 | directional flow of fluids through secondary permeable bag |
| 338 | expanding fluids between secondary permeable bag and impervious outer bag |
| 410 | vehicle in which airbag is located |
| 411 | vehicle windshield |
| 412 | vehicle roof |
| 413 | vehicle dashboard |
| 414 | steering wheel |
| 415 | head rest |
| 416 | seat |
| 418 | seat back |
| 420 | vehicle occupant |
| 430 | airbag generally |
| 431 | outer wall of airbag |
| 432 | impermeable membrane |
| 433 | membrane attachment to outer wall |
| 434 | primary portion of airbag with high pressure expanding fluids |
| 436 | low pressure filling tube |
| 437 | low pressure expanding fluids |
| 438 | secondary compartment of airbag with expanding fluids under reduced pressure |
| 440 | high pressure filling tube |
| 442 | high pressure expanding fluids |
| 510 | automobile roof and ceiling with pressurized airbag |
| 511 | windshield |
| 512 | roof |
| 525 | ceiling |
| 531 | airbag |
| 535 | pressurized fluids |
| 550 | high pressure relief valve |

FIG. 1 illustrates, schematically, in section, a portion of a vehicle (automobile) 10, having a windshield 11, roof 12, dashboard 13, steering wheel 14, head rest 15, seat 16, and seat back 18. A passenger (the driver) 20 is shown seated with an airbag 30 suitable to practice the method of this invention inflating.

The airbag 30 of this invention is compartmentalized. The outer wall 31 of the bag is impervious and has a permeable membrane 32 attached by means known to those skilled in the art at 33 to the inner surface of the wall 31. The membrane 33 forms a compartment 38 which will have reduced pressure during expansion compared to the pressure in the primary portion 34 of the airbag as described below.

In the event of an accident in which the vehicle 10 is involved, the airbag 30 will expand by inflation in a manner known to those skilled in the art, which may be by explosive charges within the airbag or by pressurized expanding fluid 42 through an inflation tube 40, a pressurized container within the bag (not shown), or the like as is known to those skilled in the art. Likewise, an inflation tube or other means known to those skilled in the art (not shown) acting under reduced pressure and velocity could be used as the primary inflation means for the secondary compartment. The expanding fluids 34 within the primary compartment gradually seep through the membrane 32 causing the fluids in secondary compartment 38 to be under less pressure than the primary compartment during expansion. After full expansion and equalization of pressures the fluids can flow back through the membrane to reduce pressure on various parts of the body or other cargo being restrained by the airbag. The multi-directional flow of pressurized fluids is indicated by the arrows 36.

The permeable membrane can be formed of a generally permeable material, or it can have pop off valves or the like to allow the delayed and reduced pressure inflation of the portion of the airbag which comes in contact with a human or other cargo. This will be understood by those skilled in the art. One specific way in which special pop off valves might be constructed would be to have hook and loop material with either the hook material or the loop material surrounding a perforation in a permeable bag material with the other material adhering. In this way, when sufficient pressure was built up the adhering material would wholly or partially give way allowing the expanding fluids to fill.

Although I have not illustrated it, I use hook and loop material in connection with my new airbags (and this will apply to other air bags). I have one of the hook or loop material strategically located upon parts of the interior of a vehicle such as the dashboard, seats, doors, etc. of the vehicle and/or on seat and shoulder belts, or clothing, or other cargo, with the matching hook and loop material on the exterior of the airbag. This results in the adhesion of the bag in place with respect to the vehicle and the vehicle occupants or cargo. This results in minimum movement of the vehicle occupants within the vehicle after an activation of the airbag. This in turn further results in minimizing injuries or damage by reducing the shifting movement and resulting damage resulting from most vehicle accidents, even those with conventional airbags in place. Illustration is unnecessary since this will be understood by those skilled in the art.

Figure 2:
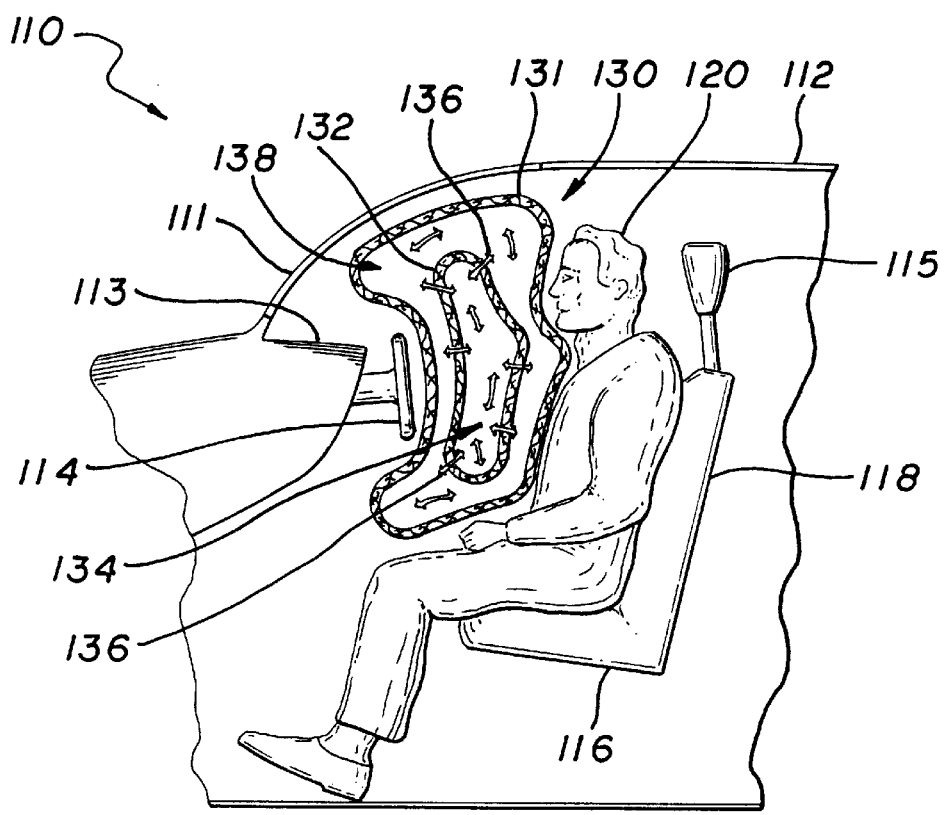
FIG. 2 is a view similar to FIG. 1 of an alternate embodiment of a deploying airbag suitable to practice the method of this invention.

FIG. 2 is a view similar to FIG. 1 illustrating an alternate embodiment of a device suitable to practice the method of this invention. A portion of vehicle generally 110 including a windshield 111, a roof 112, dashboard 113, steering wheel 114, seat 116, seat back 118, and head rest 115 is shown. Driver 120 is seated in the seat.

A double airbag 130 comprises an outer impermeable bag 131 and an interior permeable bag 132. In this case, the inflation by expanding fluids will be within the interior bag 132. The expanding fluids 134 will permeate through the wall of the bag 132 and into the space 138 between the bags under reduced pressure. When pressure has equalized fluids can flow in both directions 136 in order to accommodate different contours of objects being impacted with relatively equal pressure.

Figure 3:
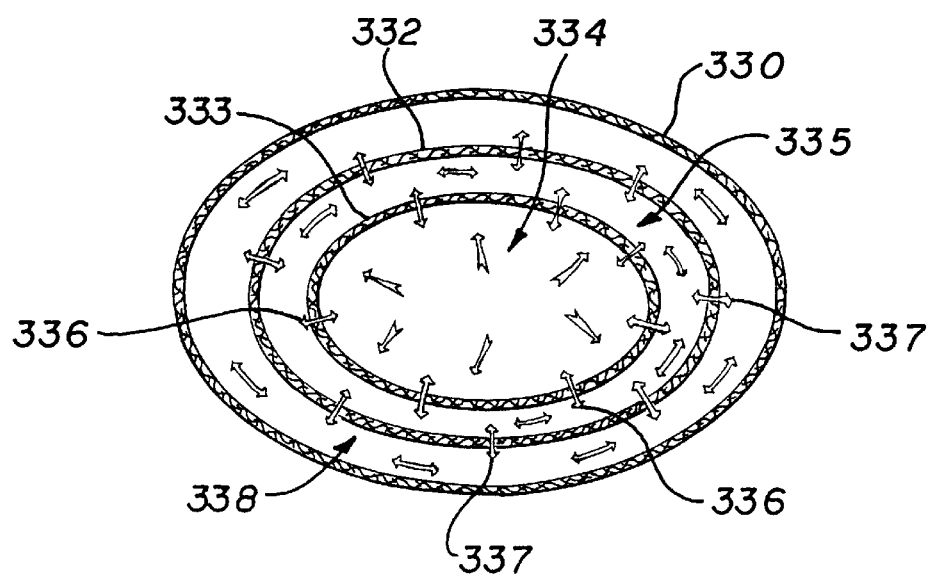
FIG. 3 is a sectioned schematic view of another alternate embodiment of an airbag suitable to practice the method of this invention.

FIG. 3 illustrates another alternate embodiment of an airbag suitable to practice the method of this invention. An impervious bag 330 contains a first smaller permeable bag 332, and bag 332 contains a still smaller permeable bag 333. Expanding fluids 334 will be introduced into bag 333. The expanding fluids 335 will permeate through bag 333 into the space between bags 333 and 332 at a pressure less than the pressure of fluids 334. In turn, the fluids 335 will permeate into the space between bags 332 and 330 and become expanding fluids 338 at a still lower pressure than the pressure of fluids 335. The fluids will then be capable of flowing in both directions through the permeable bags as shown by the arrows 336 and 337.

Figure 4:
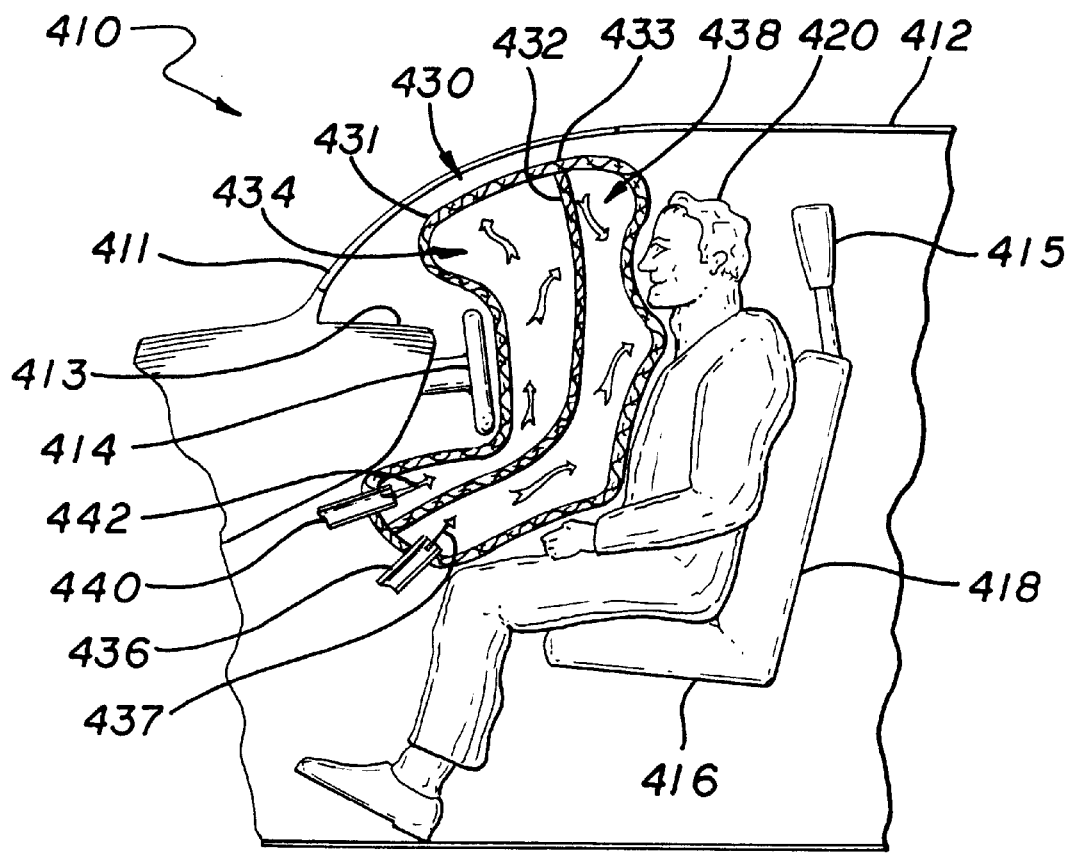
FIG. 4 is a view similar to FIG. 1 of another embodiment of an airbag suitable to practice the method of this invention.

FIG. 4 illustrates another alternate embodiment of an airbag suitable to practice the method of this invention. FIG. 4 illustrates, schematically, in section, a portion of a vehicle (automobile) 410, having a windshield 411, roof 412, dashboard 413, steering wheel 414, head rest 415, seat 416, and seat back 418. A passenger (the driver) 420 is shown seated with an airbag 430 suitable to practice the method of this invention inflating.

The airbag 430 of this invention is compartmentalized. The outer wall 431 of the bag is impervious and has an impervious membrane 432 attached by means known to those skilled in the art at 433 to the inner surface of the wall 431. The membrane 433 forms a compartment 438 which will have reduced pressure during expansion compared to the pressure in the primary portion 434 of the airbag as described below.

In the event of an accident in which the vehicle 410 is involved, the airbag 430 will expand by inflation in a manner known to those skilled in the art, which may be by explosive charges within the airbag or by pressurized expanding fluid 442 through an inflation tube 440, a pressurized container within the bag (not shown), or the like as is known to those skilled in the art. An inflation tube 436 or other means know to those skilled in the art such as explosives, pressured container, or the like acting under reduced pressure and velocity compared to the primary compartment will be used as the inflation means for the secondary compartment. The expanding fluids within the primary compartment will act in the manner of a customary airbag while the fluids in secondary compartment 438 will be under less pressure than the primary compartment during expansion providing a relatively soft cushion in the area which strikes a vehicle occupant.

Figure 5:
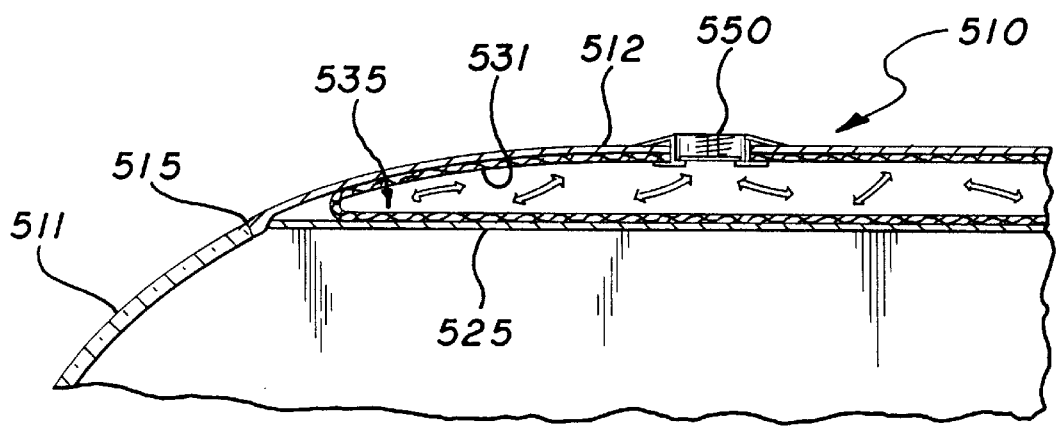
FIG. 5 is a broken away schematic sectioned view of a vehicle roof with an adjunct to enhance the method of this invention.

FIG. 5 illustrates, schematically, in section, a portion of the ceiling and roof, generally 510 of a vehicle with an adjunct of this invention which creates greater safety for occupants or cargo when involved in an accident. In this case, the vehicle windshield 511 is joined at 515 to the ceiling 525 and roof 512. The roof and ceiling will be similarly joined at the rear of the vehicle and on the sides as will be understood by those skilled in the art. An air bag 531 will fill the space between the ceiling and the roof and will be pressurized by being filled with fluids 535 under pressure. This now creates what amounts to a prestressed roof over the vehicle. If the vehicle rolls over, the prestressed roof will resist crushing from the outside or bursting from the inside due to the pressure of an airbag within the vehicle or being impacted by a body or cargo. A high pressure relief valve 550 will be provided in order to absorb energy under a severe crash circumstance and thus prevent bursting of the bag 531.

As desired other portions of the vehicle may be prestressed in this same by placing airbags of this nature within door panels and the like.

Throughout the foregoing description I have referred to the lower pressure compartment, or bag, being the bag which will contact the vehicle occupants or cargo. It is to be recognized that the compartment or bag which impacts the occupants or cargo could be the higher pressure compartment or bag. In that event, the cushioning effect would come by reason of the cushioning effect transferring through the high pressure compartment or bag, since the compartment or bag will be cushioned in its contact with the lower pressure compartment or bag. This translates into a cushioned blow of the higher pressure compartment or bag against the occupants or cargo.

In all of the embodiments of air bags having multiple compartments or bags as shown and described, there will be the added advantage that puncturing of the outer bag, or any bag or compartment will still leave a degree of protection with the remaining compartment(s) in the case of FIGS. 1 and 4 or the different bags in the case of FIG. 2 and FIG. 3.

In the claims which follow if I omit, or fail to claim, one of the inventive features disclosed or suggested in this application, such failure will be inadvertent and is not intended to be an indication that I have abandoned or dedicated such feature. If such should happen it is my intent to reissue the patent when I discover any such omission or failure.

While the embodiments of this invention specifically shown and described are fully capable of achieving the objects and advantages desired it is to be understood that such embodiments are for purposes of illustration only and not for purposes of limitation.

I claim:

1. The method of preventing collapse of a vehicle roof in a vehicular accident comprising: placing an inflatable airbag having a high pressure pop off valve within a space between the roof and a ceiling of a vehicle having a roof and a ceiling joined around their perimeters to create said space; prestressing said roof and ceiling by inflating the inflatable airbag prior to any vehicular accident occurring such that the prestressed roof and ceiling prevent collapse of the roof in a vehicular accident.

* * * * *